(12) United States Patent
Nagasaka

(10) Patent No.: US 8,576,461 B2
(45) Date of Patent: Nov. 5, 2013

(54) IMAGE READER

(75) Inventor: Hideaki Nagasaka, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 313 days.

(21) Appl. No.: 12/949,168

(22) Filed: Nov. 18, 2010

(65) Prior Publication Data
US 2011/0211236 A1 Sep. 1, 2011

(30) Foreign Application Priority Data

Feb. 26, 2010 (JP) ................................ 2010-042575

(51) Int. Cl.
H04N 1/04 (2006.01)
H04N 1/46 (2006.01)

(52) U.S. Cl.
USPC ............................ 358/482; 358/474; 358/505

(58) Field of Classification Search
None
See application file for complete search history.

(56) References Cited

U.S. PATENT DOCUMENTS

| 5,136,665 | A | 8/1992 | Inoue |
| 7,019,873 | B2 | 3/2006 | Tohyama et al. |
| 2002/0039207 | A1 | 4/2002 | Kanda |
| 2002/0057472 | A1 | 5/2002 | Kono |
| 2004/0001187 | A1 | 1/2004 | Fukusaka |
| 2005/0134944 | A1 | 6/2005 | Chen |
| 2006/0044620 | A1 | 3/2006 | Namikawa |
| 2007/0120989 | A1 | 5/2007 | Minami et al. |
| 2008/0049269 | A1 | 2/2008 | Chen |
| 2008/0068683 | A1 | 3/2008 | Kanno |
| 2008/0273229 | A1 | 11/2008 | Morisawa |
| 2009/0034001 | A1 | 2/2009 | Shiraishi et al. |
| 2009/0122365 | A1 | 5/2009 | Noda et al. |

FOREIGN PATENT DOCUMENTS

| CN | 1717021 A | 1/2006 |
| CN | 101299792 A | 11/2008 |
| EP | 1 379 070 A2 | 1/2004 |
| EP | 1 903 804 A2 | 3/2008 |
| JP | 5-268424 | 10/1993 |
| JP | 2002-135539 | 5/2002 |
| JP | 2002-218185 | 8/2002 |
| JP | 2003-163766 | 6/2003 |

(Continued)

OTHER PUBLICATIONS

Extended European Search Report dated Mar. 17, 2011 from related European Application No. 10251892.5.

(Continued)

Primary Examiner — Thierry Pham
(74) Attorney, Agent, or Firm — Scully, Scott, Murphy & Presser, P.C.

(57) ABSTRACT

An image reader includes a first image reading unit that reads a first image on a first side of a sheet to output a first analog signal corresponding to the first image, a second image reading unit that reads a second image on a second side of the sheet, converts a second analog signal corresponding to the second image into a second digital signal, and outputs the second digital signal, a processor that processes the first analog signal and the second digital signal and includes a first converter converting the first analog signal into a first digital signal, and a timing signal output unit outputting, to the second image reading unit, a timing signal corresponding to a conversion time of the conversion by the first converter. Based on the timing signal, the second image reading unit outputs the second digital signal at a time outside the conversion time.

4 Claims, 11 Drawing Sheets

(56) References Cited

FOREIGN PATENT DOCUMENTS

| JP | 2004-40311 | | 2/2004 |
|---|---|---|---|
| JP | 2004-180026 | | 6/2004 |
| JP | 2004180026 A | * | 6/2004 |
| JP | 2005-295204 | | 10/2005 |
| JP | 2006-67441 | | 3/2006 |
| JP | 2007-82033 | | 3/2007 |
| JP | 2007-150560 | | 6/2007 |
| JP | 2009-124633 | | 6/2009 |

OTHER PUBLICATIONS

Notification of Reasons for Rejection dated Jan. 24, 2012 received from the Japanese Patent Office from related Japanese Application No. 2010-042575, together with an English-language translation.
Extended European Search Repot dated Mar. 15, 2011.
Japanese Decision of Rejection dated Apr. 24, 2012 from related Japanese Application No. 2010-042575, together with an English-language translation.
Office Action dated Jan. 9, 2013 from related U.S. Appl. No. 12/948,173.
U.S. Office Action dated Mar. 27, 2013 in U.S. Appl. No. 12/948,173.
Chinese Office Action dated Mar. 26, 2013 in Chinese Patent Application No. 201110049836.7.
Chinese Office Action dated Apr. 7, 2013 in Chinese Patent Application No. 201110049871.9.
Notice of Allowance dated Jul. 26, 2013 received in U.S. Appl. No. 12/948,173.
Chinese Official Action dated Aug. 14, 2013 from related Chinese Patent Application No. 201110049836.7.

* cited by examiner

IMAGE READER

CROSS-REFERENCE TO RELATED APPLICATION

This application claims priority under 35 U.S.C. §119 from Japanese Patent Application No. 2010-042575 filed on Feb. 26, 2010. The entire subject matter of the application is incorporated herein by reference.

BACKGROUND

1. Technical Field

The following description relates to one or more image readers configured to read an image of a document sheet, particularly to one or more image readers having a first image reading unit configured to read an image on a first side of a document sheet conveyed along a feeding path and a second image reading unit configured to read an image on a second side of the document sheet.

2. Related Art

So far, an image reader configured to read an image of a document sheet has been applied to various devices such as an image scanner, a copy machine, and a facsimile machine. To attain a function of the image reader of this kind to read images on both sides of a document sheet, an image reader has been proposed that has a single image reading unit configured to read the images on the both sides of the document sheet by reversing the document sheet on an improved feeding path. In addition, recently, an image reader has been proposed that is configured to read images on both sides of a document sheet together using two image reading units. For example, in an image reader having a first image reading unit configured to read an image on a first side of a document sheet being conveyed along a feeding path and a second image reading unit configured to read an image on a second side of the document sheet being conveyed along the feeding path, it is possible to perform, in parallel, an operation of reading the image on the first side using the first image reading unit and an operation of reading the image on the second side using the second image reading unit. Thus, it is possible to enhance a reading speed for reading the both sides of the document sheet.

SUMMARY

However, when the two image reading units are used, and a single processor processes respective signals output from the two image reading units, it might result in a so-called crosstalk due to interference between the signals.

Aspects of the present invention are advantageous to provide one or more improved techniques for an image reader having a first image reading unit configured to read an image on a first side of a document sheet being conveyed along a feeding path and a second image reading unit configured to read an image on a second side of the document sheet being conveyed along the feeding path, which techniques make it possible to reduce a level of crosstalk between respective signals transmitted by the first and second image reading units to a processor.

According to aspects of the present invention, an image reader is provided, which includes a first image reading unit including a first sensor configured to read an image on a first side of a document sheet being conveyed on a feeding path, the first image reading unit being configured to output a first analog signal corresponding to the image read by the first sensor, a second image reading unit including a second sensor configured to read an image on a second side opposite to the first side of the document sheet being conveyed on the feeding path, and a second converter configured to convert a second analog signal corresponding to the image read by the second sensor into a second digital signal, the second image reading unit being configured to output the second digital signal, a processor configured to process the first analog signal output from the first reading unit and the second digital signal output from the second image reading unit, the processor including a first converter configured to convert the first analog signal output from the first image reading unit into a first digital signal and output the first digital signal, and a timing signal output unit configured to output, to the second image reading unit, a timing signal corresponding to a conversion time when the first converter converts the first analog signal into the first digital signal. The second image reading unit is configured to, based on the timing signal output from the timing signal output unit, output the second digital signal at an output time outside the conversion time.

According to aspects of the present invention, further provided is an image reader that includes a first image reading unit including a first sensor configured to read an image on a first side of a document sheet being conveyed on a feeding path, the first image reading unit being configured to output a first analog signal corresponding to the image read by the first sensor, at intervals of a predetermined time period, a second image reading unit including a second sensor configured to read an image on a second side opposite to the first side of the document sheet being conveyed on the feeding path, and a second converter configured to convert a second analog signal corresponding to the image read by the second sensor into a second digital signal, the second image reading unit being configured to output the second digital signal at intervals of the predetermined time period, and a processor configured to process the first analog signal output from the first reading unit and the second digital signal output from the second image reading unit, the processor including a first converter configured to convert the first analog signal output from the first image reading unit into a first digital signal and output the first digital signal, and a comparison unit configured to make a comparison between a first time period taken for the first image reading unit to output the first analog signal in the predetermined time period and a second time period taken for the second image reading unit to output the second digital signal in the predetermined time period, and a timing signal output unit configured to output, to the second image reading unit, a timing signal for controlling the second converter to output the second digital signal, during a time period outside a conversion time when the first converter converts the first analog signal into the first digital signal, at a duty ratio determined based on the comparison made by the comparison unit. The second image reading unit is configured to, in response to the timing signal output from the timing signal output unit, output the second digital signal during the time period outside the conversion time when the first converter converts the first analog signal into the first digital signal.

BRIEF DESCRIPTION OF THE ACCOMPANYING DRAWINGS

Figure 4:
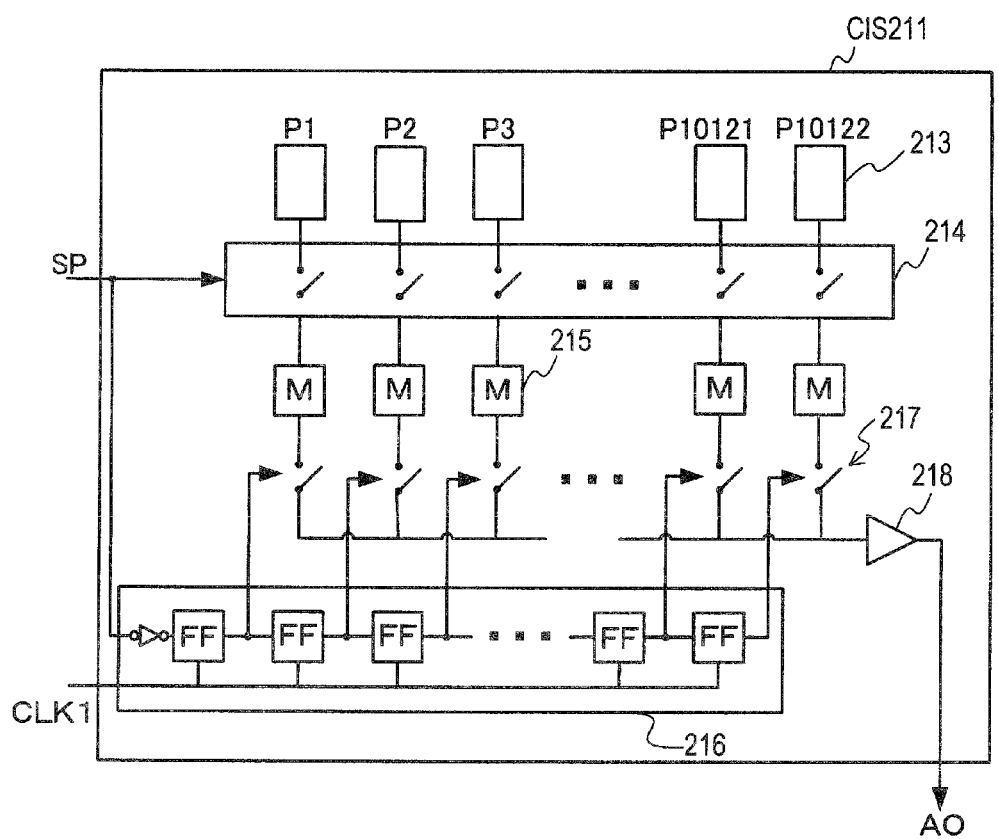

FIG. 4 schematically shows a configuration of a contact image sensor (CIS) of the image reader in the embodiment according to one or more aspects of the present invention.

Figure 5A:
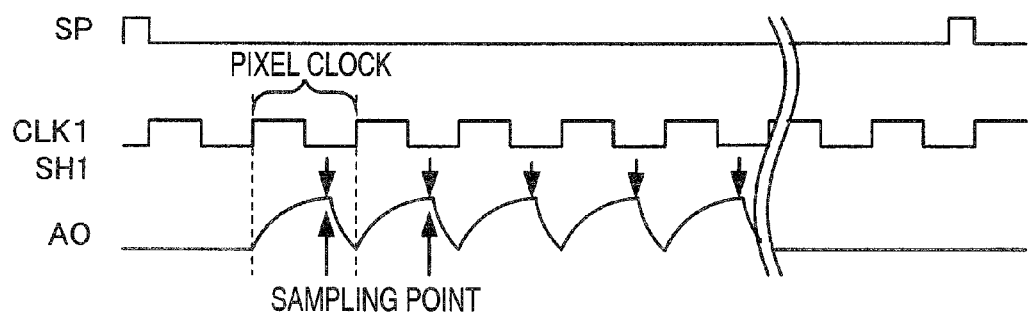
Figure 5B:
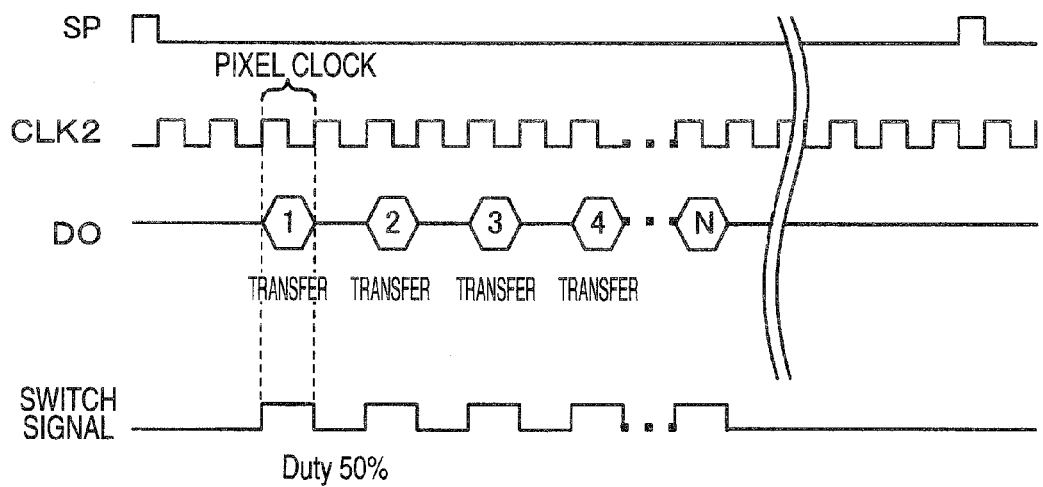

FIGS. 5A and 5B exemplify waveforms of signals transferred in the image reader in the embodiment according to one or more aspects of the present invention.

Figure 6:
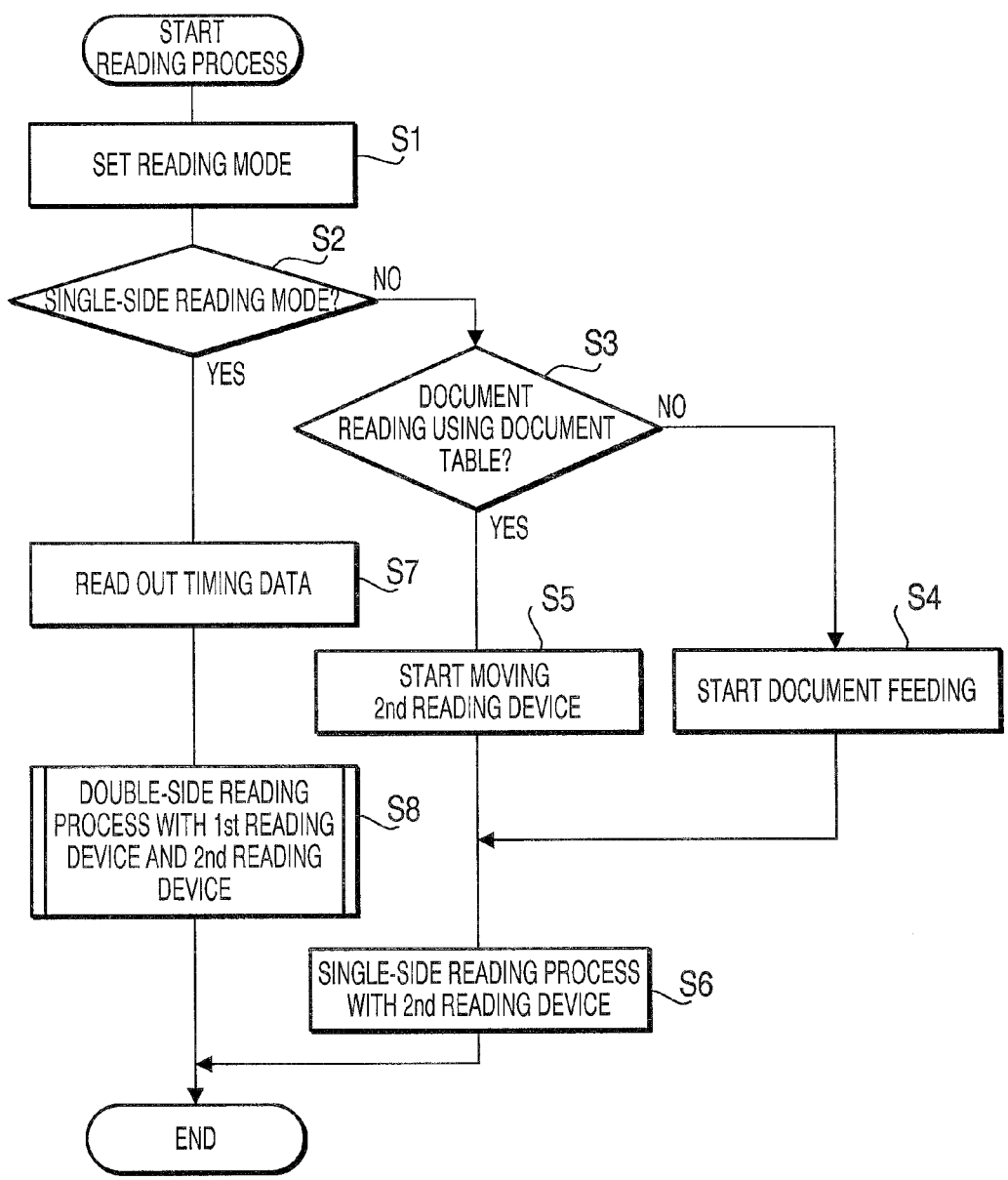

FIG. 6 is a flowchart showing a procedure of a reading process to be executed by the control system in the embodiment according to one or more aspects of the present invention.

Figure 7:
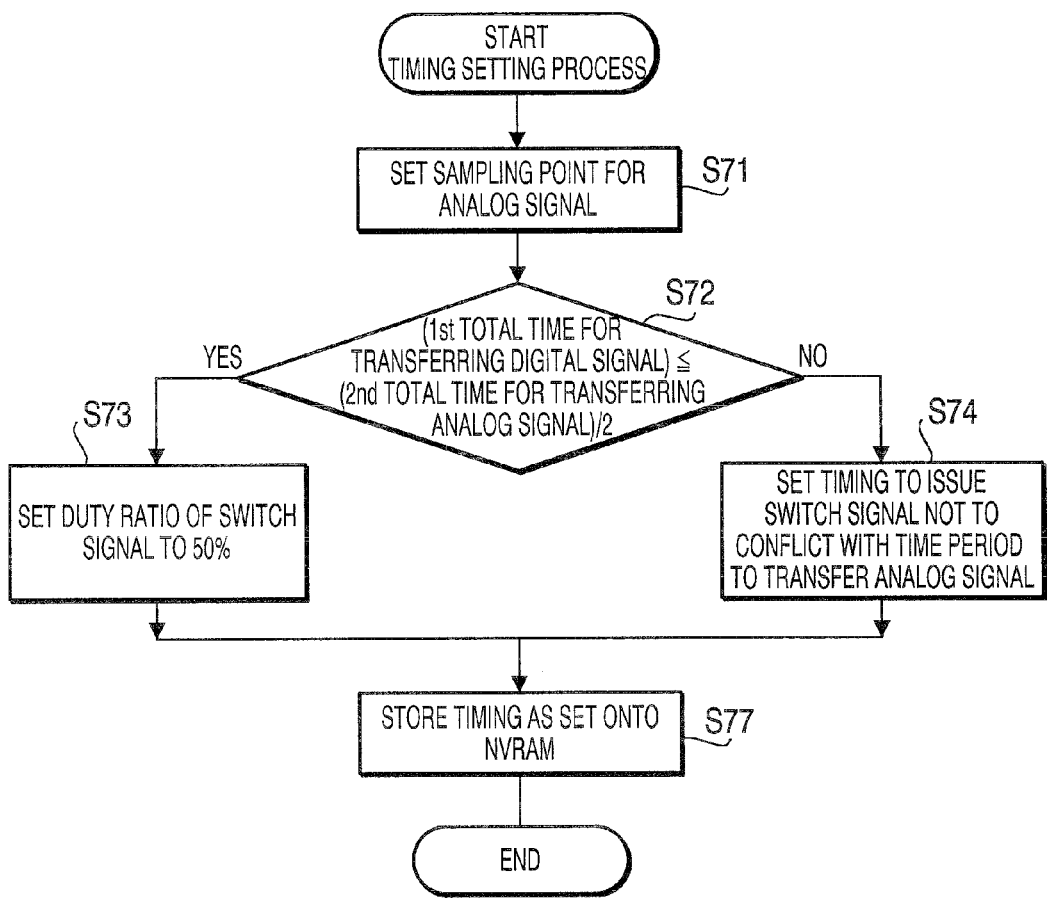

FIG. 7 is a flowchart showing a procedure of a timing setting process to be executed before shipment of the MFP in the embodiment according to one or more aspects of the present invention.

Figure 8A:
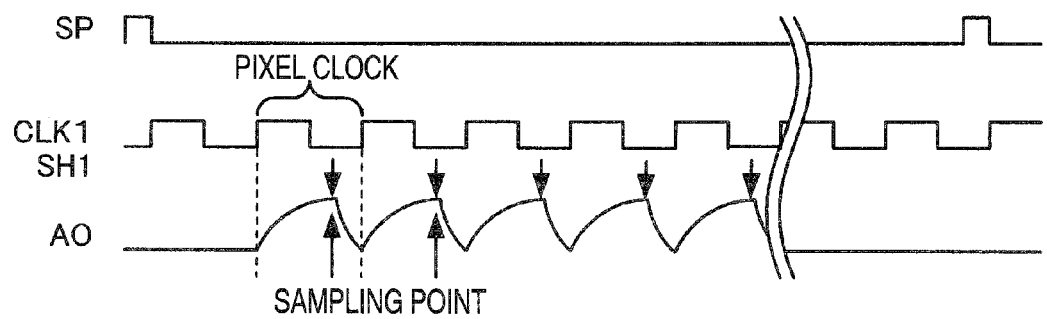
Figure 8B:
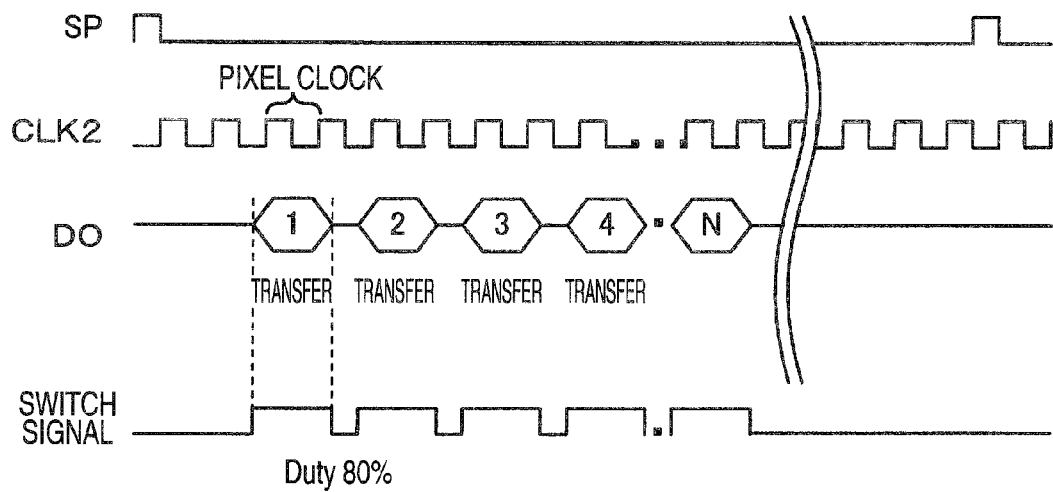

FIGS. 8A and 8B show different examples of signals transferred in the image reader in the embodiment according to one or more aspects of the present invention.

Figure 9:
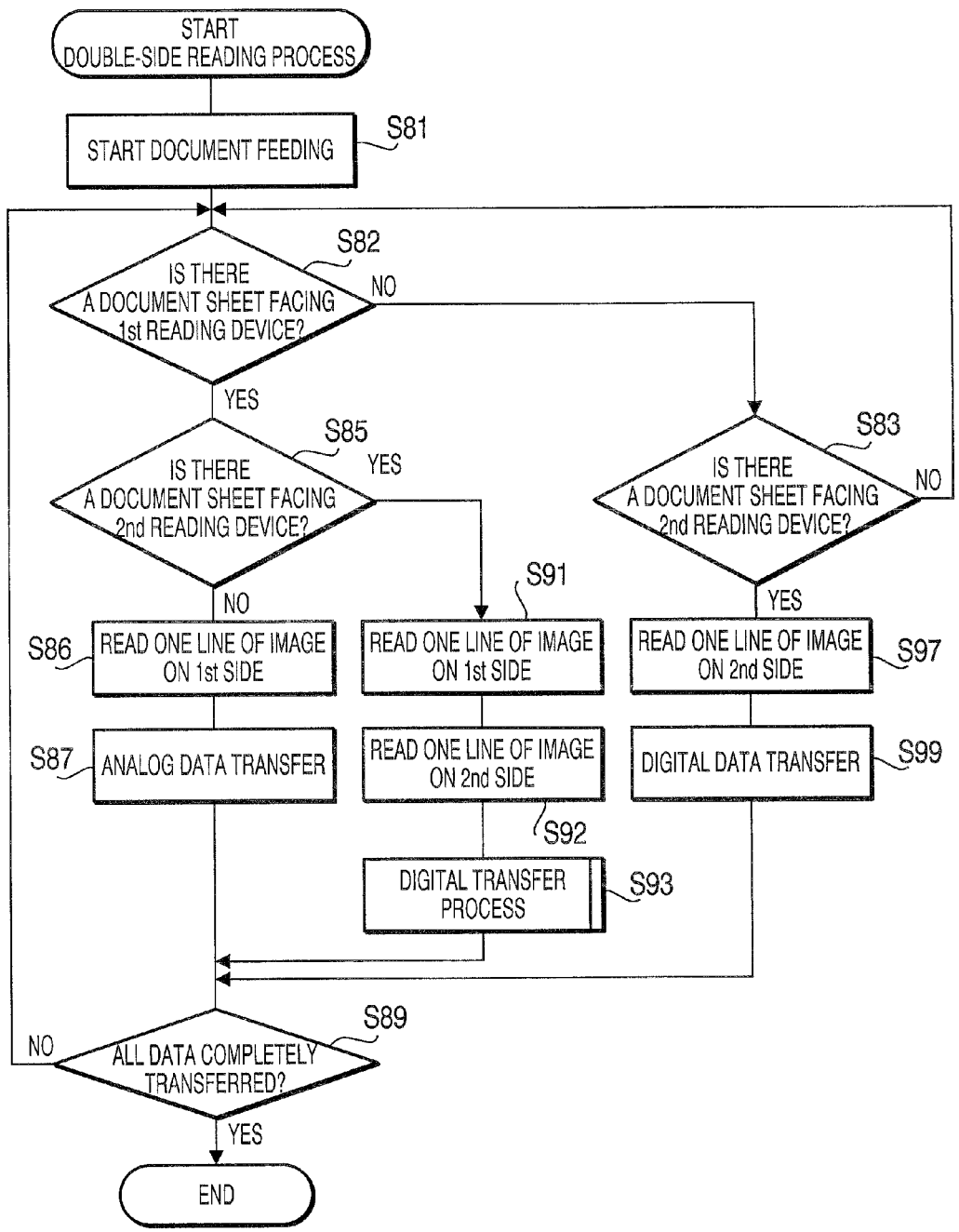

FIG. 9 is a flowchart showing a detailed procedure of a double-side reading process to be executed in the reading process in the embodiment according to one or more aspects of the present invention.

Figure 10:
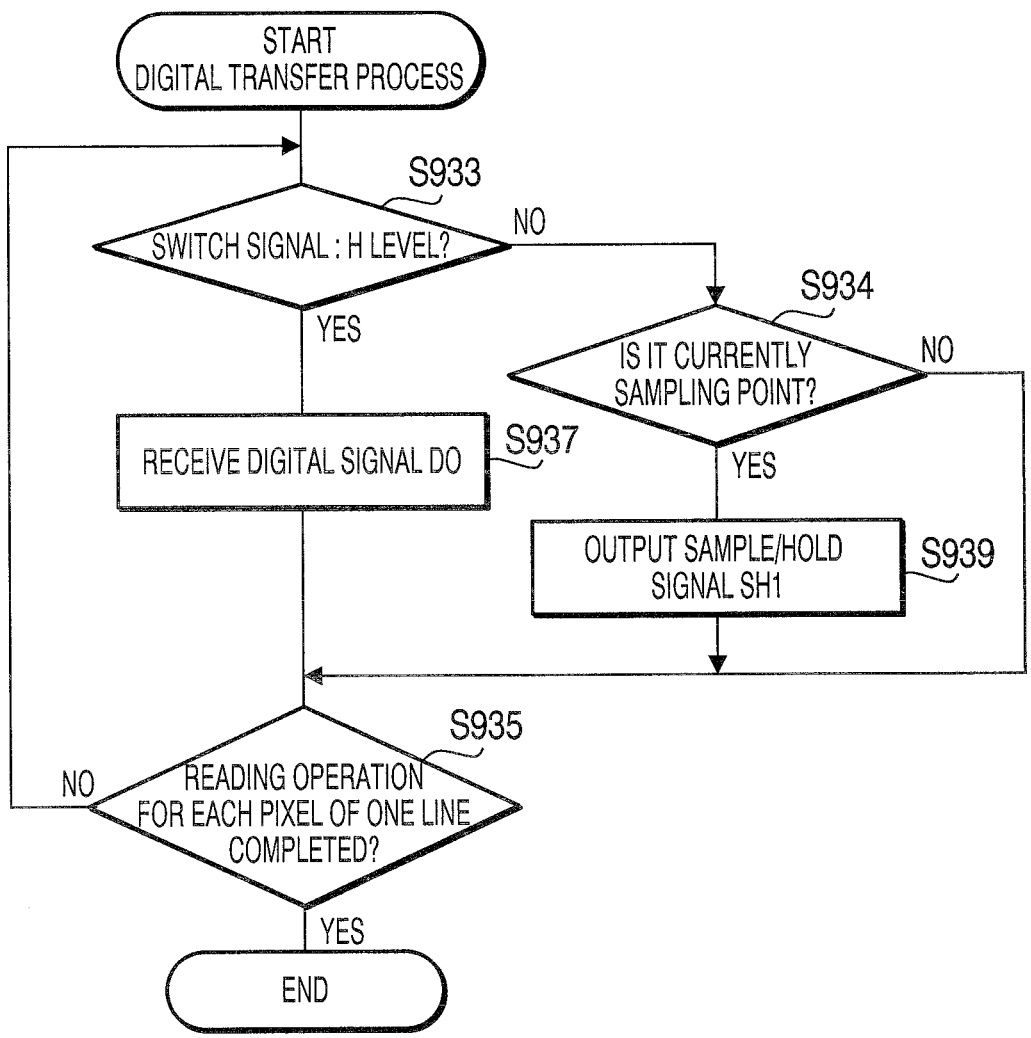

FIG. 10 is a flowchart showing a detailed procedure of a digital transfer process to be executed in the double-side reading process in the embodiment according to one or more aspects of the present invention.

Figure 11:
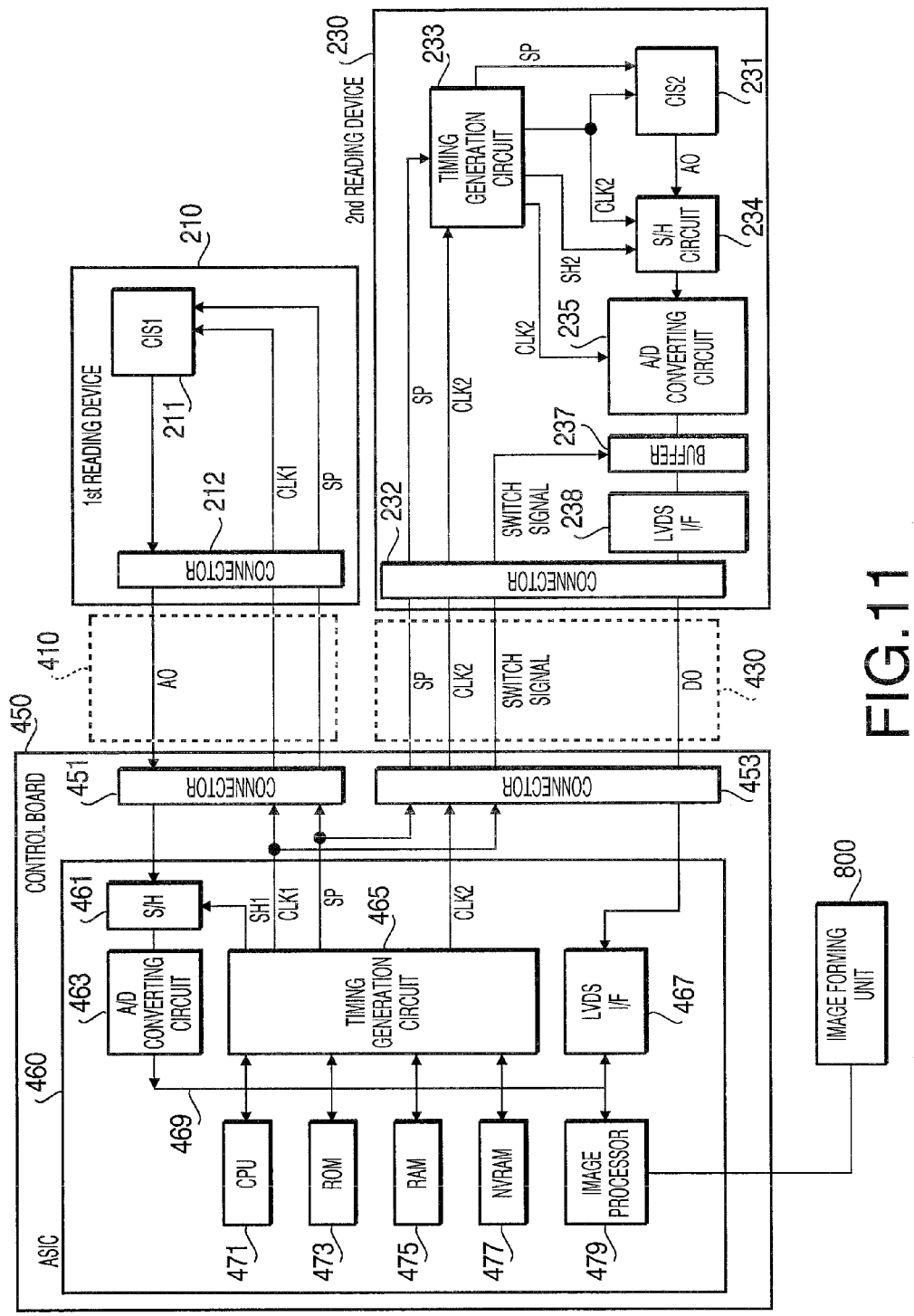

FIG. 11 is a block diagram showing a configuration of a control system of the image reader in a modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
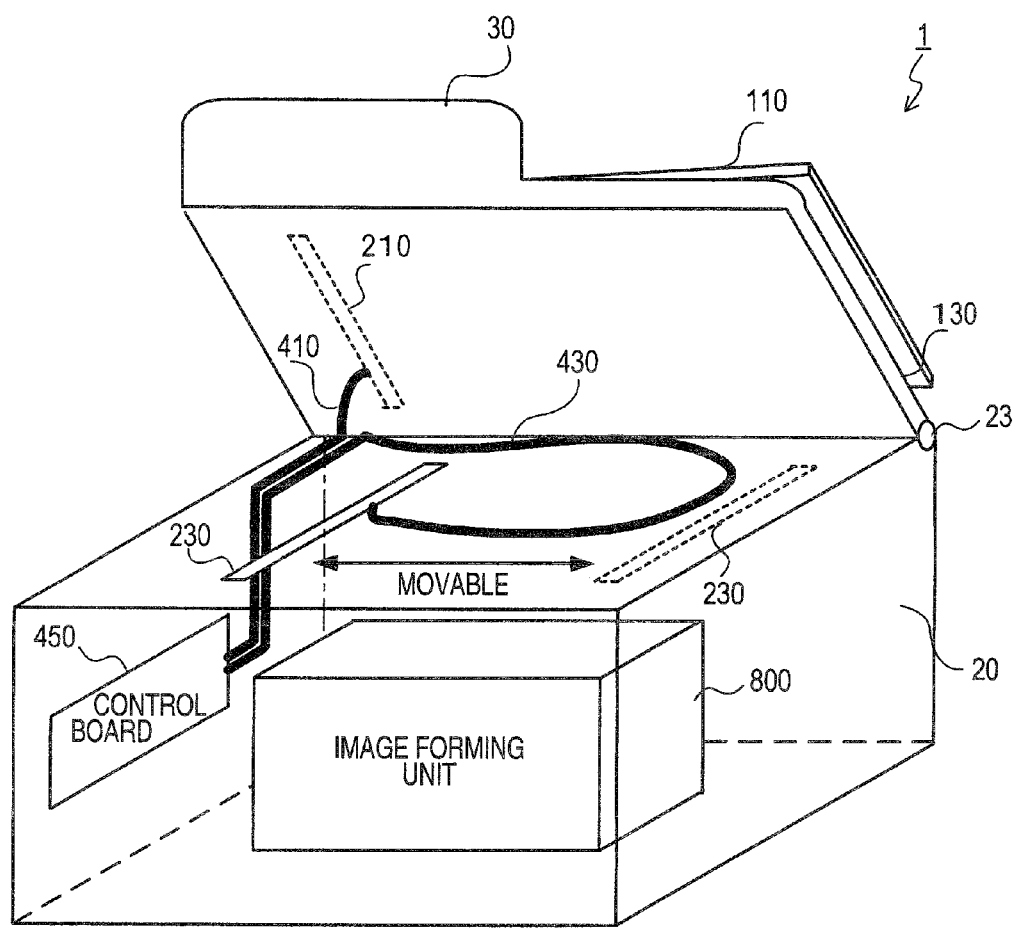
FIG. 1 is a perspective view schematically showing a configuration of a multi-function peripheral (MFP) in an embodiment according to one or more aspects of the present invention.

Hereinafter, an embodiment according to aspects of the present invention will be described with reference to the accompany drawings. As shown in FIG. 1, a multi-function peripheral (MFP) 1 includes a base body 20 and a document cover 30 provided above the base body 20 in an openable and closable manner.

[Overall Configuration of Image Reader]

Figure 2:
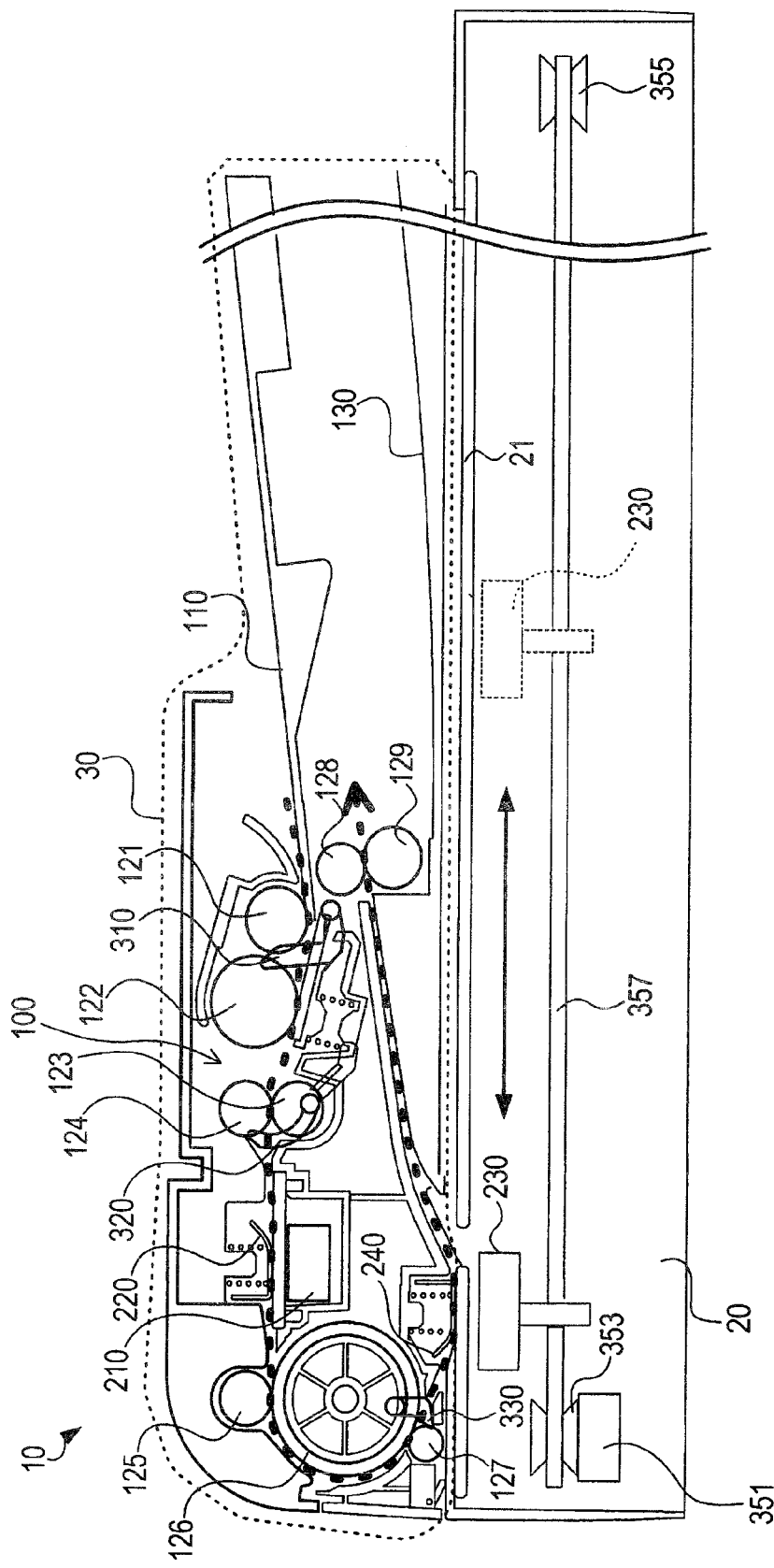
FIG. 2 is a cross-sectional view schematically showing a configuration of an image reader of the MFP in the embodiment according to one or more aspects of the present invention.

As illustrated in FIG. 2, the MFP 1 further includes a glass document table 21 provided on an upper end face of the base body 20. The document table 21 is configured such that a document sheet (not shown) is placed thereon when an image reader 10 of the embodiment is used as a flatbed scanner. The document cover 30 is attached, in an openable and closable manner, to a side (hereinafter referred to as a rear side) of the upper end face of the base body 20 via a hinge 23 (see FIG. 1). Further, the document cover 30 is configured to, when closed, cover the document sheet placed on the document table 21.

Further, as shown in FIG. 2, the document cover 30 is provided with an automatic document feeder (ADF). Specifically, the document cover 30 includes a feeding unit 100 that serves as the ADF to feed the document sheet placed on a feed tray 110 along a feeding path, and a first reading device 210 that is one of two reading devices 210 and 230 configured to read in parallel both a first side and a second side of the document sheet being conveyed on a feeding path. It is noted that the other one of the two reading devices 210 and 230, i.e., the second reading device 230 is provided in the base body 20.

The feeding unit 100 includes feed rollers 121 to 129 configured to feed the document sheet placed on the feed tray 110 to a catch tray 130 along the feeding path (see a thick dashed line in FIG. 2). Additionally, on the feeding path, there are provided an upstream reading position and a downstream reading position. In this case, the first reading device 210 for reading an image on the first side of the document sheet is disposed in a location corresponding to the upstream reading position. It is noted that the first side denotes a down-facing side of the document sheet in the state placed on the feed tray 110. Further, a first pressing member 220 is disposed on the feeding path to press the document sheet passing through the upstream reading position against a reading surface of the first reading device 210. In addition, the second reading device 230 for reading an image on the second side (opposite to the first side) of the document sheet is movably provided in a location, beneath the document table 21, which corresponds to the downstream reading position. Furthermore, a second pressing member 240 is disposed on the feeding path to press the document sheet passing through the downstream reading position against a reading surface of the second reading device 230.

Further, on the feeding path, an F sensor 310, an RB sensor 320, and an R sensor 330 are disposed as sensors to detect presence/absence of the document sheet being conveyed on respective detection positions. The second reading device 230 is fixed to an endless belt 357 wound around a pair of a driving pulley 353 driven by a motor 351 to rotate and a driven pulley 355. Thereby, the second reading device 230 is configured to, in response to rotation of the motor 351, move in an auxiliary scanning direction (i.e., a left-to-right direction in FIG. 2) under the document table 21.

As depicted in FIG. 1, the first reading device 210 and the second reading device 230 are connected with a control board 450 disposed inside the base body 20, respectively via a first harness 410 and a second harness 430 each of which is configured with a flexible flat cable (FFC). As schematically shown in FIG. 1, the second harness 430 has such a sufficient length as to allow the second reading device 230 to move over a whole area in the auxiliary scanning direction under the document table 21 (see FIG. 2). Further, the second harness 430 is provided to join the first harness 410 near the hinge 23 and extend toward the control board 450. The base body 20 includes therein an image forming unit 800 configured to form an image on a sheet based on an electrophotographic technique.

[Configuration of Control System of Image Reader]

Figure 3:
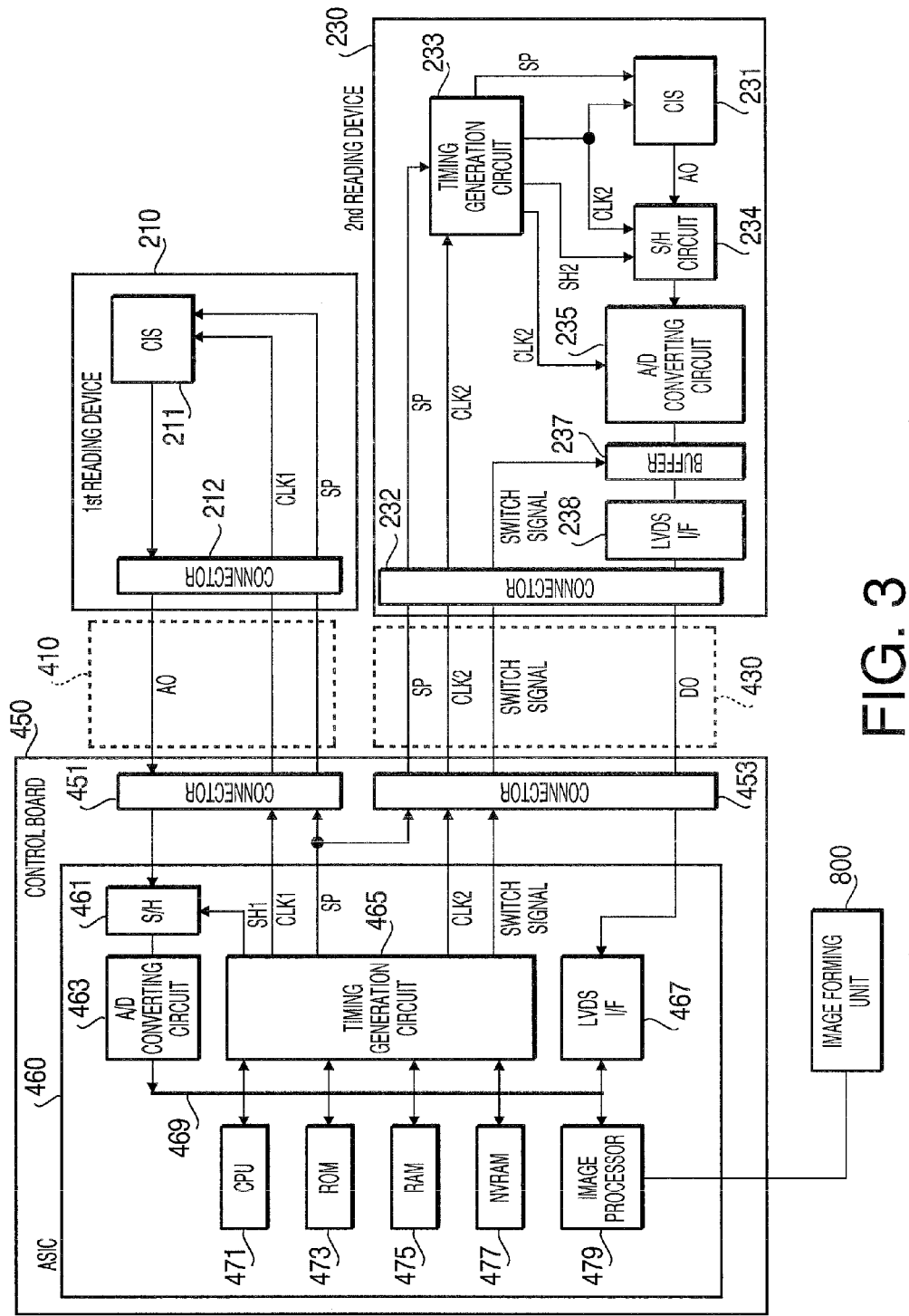
FIG. 3 is a block diagram showing a configuration of a control system of the image reader in the embodiment according to one or more aspects of the present invention.

FIG. 3 is a block diagram showing a configuration of a control system of the image reader 10. As shown in FIG. 3, the first reading device 210 includes a contact image sensor (CIS) 211 configured to, in response to receipt of a start signal SP, output an analog signal AO corresponding to a line of image in a main scanning direction (i.e., a direction perpendicular to plane of FIG. 2) on a pixel-by-pixel basis in synchronization with a rectangular-pulse-shaped clock signal CLK1. The start signal SP and the clock signal CLK1 are transferred from the control board 450 via the first harness 410, and input into the CIS 211 via a connector 212 disposed on an outer surface of the first reading device 210. Further, the analog signal AO output from the CIS 211 is transferred to the control board 450 after passing sequentially through the connector 212 and the first harness 410. It is noted that in FIG. 3, the single block "CIS 211" includes a plurality of elements such as a light source and lenses that form an optical path.

In the same manner as the first reading device 210, the second reading device 230 includes a CIS 231 configured to, in response to receipt of a start signal SP, output an analog signal AO corresponding to a line of image in the main scanning direction on a pixel-by-pixel basis in synchronization with a rectangular-pulse-shaped clock signal CLK2. The start signal SP and the clock signal CLK2 are transferred from the control board 450 via the second harness 430, and input into the CIS 231 after passing sequentially through a connector 232 disposed on an outer surface of the second reading device 230 and a timing generation circuit 233 incorporated inside the second reading device 230.

The timing generation circuit 233 is configured to issue the start signal SP and the clock signal CLK2 into the CIS 231 and also issue the clock signal CLK2 into a sample/hold circuit (S/H circuit) 234 and an A/D converting circuit 235. In addition, the timing generation circuit 233 is configured to issue a below-mentioned sample/hold signal SH2 to the S/H circuit 234.

Initially, an explanation will be provided about the configurations of the CIS 211 and the CIS 231 with reference to FIG. 4. Since the CIS 211 and the CIS 231 are configured in the same manner, FIG. 4 only shows a detailed configuration of the CIS 211. As illustrated in FIG. 4, the CIS 211 includes a plurality of light receiving elements 213 (in the embodiment, there are 10122 pieces of light receiving elements as exemplified in FIG. 4) that are configured to receive light reflected by the document sheet in their respective positions in the main scanning direction. Each light receiving element 213 stores electric charges corresponding to the light intensity of the received light. When a switch circuit 214 is switched from an OFF state to an ON state in response to the start signal SP, the electric charges stored in the light receiving elements 213 are transferred onto respective memories 215 provided individually for the light receiving elements 213.

Further, when the start signal SP is input in the CIS 211, a shift register 216 is activated that incorporates therein flip-flops of the same number as the number of the light receiving elements 213 (i.e., the number of pixels in the main scanning direction). Then, respective switches 217 provided individually for the memories 215 are sequentially switched from an OFF state to an ON state in synchronization with the clock signal CLK1. Thereafter, the electric charges held on each memory 215 are input into an amplifier 218 to be amplified, and transmitted outside as the analog signal AO. At this time, the analog signal AO output from each of the CIS 211 and the CIS 231 has a waveform of a wave delayed with a predetermined time constant as exemplified in FIG. 5A, which waveform results from some causes such as the amplification by the amplifier 218.

The sample/hold signal SH2 is output with a form such as a trigger pulse, at such conversion timing (i.e., a sampling point) as to acquire a value around each peak of the waveform of the analog signal AO, which value represents the light intensity of the light received from each pixel in the most appropriate manner. It is noted that FIG. 5A shows a sample/hold signal SH1 that is input into a below-mentioned sample/hold circuit 461 as illustrated in FIG. 3 in response to the analog signal AO from the CIS 211. The sample/hold signal SH2, which is input into the S/H circuit 234 in response to the analog signal AO from the CIS 231, has substantially the same form as the SH1 as shown in FIG. 5A.

It is noted that the second reading device 230 is configured to perform therein signal processing up to A/D conversion. Therefore, the waveform of the analog signal AO output from the CIS 231 is less likely to be deformed while being transferred, and thus it is possible to set the reading speed of the CIS 231 faster. For this reason, in the embodiment, as exemplified in FIGS. 5A and 5B, the period of the clock signal CLK2 is set to half as long as that of the clock signal CLK1.

Referring back to FIG. 3, the (analog) value, which the S/H circuit 234 acquires in response to receipt of the sample/hold signal SH2, is converted into a digital value by the A/D converting circuit 235 incorporated in the second reading device 230. Subsequently, the digital value is held (stored) in a buffer 237. Then, when the buffer 237 receives a switch signal transmitted by the control board 450 via the second harness 430 and the connector 232, the digital value is transferred into an LVDS interface 238. The LVDS interface 238 converts the digital value into a digital signal DO to be transmitted in a differential transmission method, and transfers the digital signal DO to the control board 450 via the connector 232 and the second harness 430. It is noted that three signal lines ("ground," "+," and "−") are required for the differential transmission method, but a single line for transferring the digital signal DO is shown in FIG. 3 for the sake of simple explanation.

The control board 450 includes a connector 451 configured to perform therethrough I/O operations of transmitting/receiving the aforementioned various signals to/from the first reading device 210 via the first harness, a connector 453 configured to perform therethrough I/O operations of transmitting/receiving the aforementioned various signals to/from the second reading device 230 via the second harness 430, and an ASIC 460 configured to perform various kinds of processing. In the same fashion as the second reading device 230, the ASIC 460 includes a sample/hold circuit (S/H) 461 and an A/D converting circuit 463 that are configured to convert the analog signal AO transferred from the CIS 211 of the first reading device 210 into a digital signal.

In addition, the ASIC 460 includes a timing generation circuit 465 configured to issue the sample/hold signal SH1 to the sample/hold circuit 461 and output the aforementioned clock signals CLK1 and CLK2, start signal SP, and switch signal. The ASIC 460 further includes an LVDS interface (LVDS I/F) 467 configured to convert the digital signal DO transferred from the second reading device 230 in the differential transmission method into a normal digital signal. The timing generation circuit 465 is configured to output, from a single terminal, the same start signal SP to each of the first reading device 210 and the second reading device 230. The start signal SP is divided into two start signals SP outside the ASIC 460, and the two start signals SP are transferred to the first reading device 210 and the second reading device 230 via the connectors 451 and 453, respectively.

The digital signals output from the A/D converting circuit 463 and the LVDS interface 467 are transferred to a bus line 469 connected with a CPU 471, a ROM 473, a RAM 475, an NVRAM 477, and an image processor 479, as well as the aforementioned timing generation circuit 465. Thereby, the ASIC 460 is allowed to perform operations such as deploying the images read by the first reading device 210 and the second reading device 230 in line buffers set on the RAM 475, performing image processing for the images held in the line buffers on the RAM 475 with the image processor 479, and issuing a driving signal to the image forming unit 800.

[Processes in Control System]

Subsequently, an explanation will be provided about processes to be executed by the CPU 471 of the ASIC 460 based on programs stored on the ROM 473.

As shown in FIG. 6, when starting a reading process, the CPU 471 sets a reading mode between a single-side reading mode and a double-side reading mode based on an instruction issued through an operation panel (S1). When the single-side reading mode is set (S2: Yes), the CPU 471 determines whether to perform document reading with the document table 21 (S3). When determining not to perform document reading with the document table 21 (S3: No), the CPU 471 controls the feeding unit 100 to start document feeding (S4), and goes to S6. Meanwhile, when determining to perform document reading with the document table 21 (S3: Yes), the CPU 471 controls the motor 351 to start moving the second reading device 230 (S5), and goes to S6. In S6, the CPU 471 controls the second reading device 230 to perform single-side reading while performing the document feeding using the feeding unit 100 or moving the second reading device 230 with the motor 351 (S6). Thereafter, the CPU 471 terminates the reading process.

Meanwhile, when the double-side reading mode is set (S2: No), the CPU 471 goes to S7, where the CPU 471 reads out timing data that has previously been stored on the NVRAM 477 before shipment of the MFP 1 in accordance with a timing setting process as shown in FIG. 7 (S7).

As shown in FIG. 7, in the timing setting process, the CPU 471 initially sets the aforementioned sampling point for the analog signal AO output from each of the CIS 211 and the CIS 231, depending on characteristics of the amplifier 218 (S71). Subsequently, the CPU 471 compares a first total time taken for transferring the digital signal DO of one pixel via the second harness 430 with a second total time taken for transferring the analog signal AO of one pixel via the first harness 410 (S72). When determining that the first total time is equal to or shorter than half the second total time (S72: Yes), the CPU 471 goes to S73. Meanwhile, when determining that the first total time is longer than half the second total time (S72: No), the CPU 471 goes to S74.

In S73, since the first total time is equal to or shorter than half the second total time, the CPU 471 sets a duty ratio of the switch signal for instructing to transfer the digital signal DO to 50% (S73). Meanwhile, in S74, the CPU 471 sets the timing (time period) to output the switch signal for instructing to transfer the digital signal DO, such that the digital signal DO is not transferred during a time period taken for the CIS 211 to transfer the analog signal AO (i.e., around each sampling point set in S71 (S74).

In other words, the analog signal AO is output from the CIS 211 in synchronization with each rising of the clock signal CLK1. Accordingly, in general as exemplified in FIG. 5A, each sampling point for the analog signal AO is set in the last half in a pixel clock that is defined as a period of the clock signal CLK1 with a high (H) level and a low (L) level alternating at a duty ratio of 50%.

Therefore, when the first total time taken for transferring the digital signal DO is equal to or shorter than half the second total time taken for transferring the analog signal AO (S72: Yes), by using a switch signal that takes a predetermined H level periodically at a duty ratio of 50% in the same manner as the clock signal CLK1, it is possible to prevent the timing to output the switch signal (specifically, the time period when the switch signal is output, i.e., a time period when the switch signal takes the H level) from conflicting with a time period around the sampling point for the analog signal AO (S73). Meanwhile, when the first total time taken for transferring the digital signal DO is longer than half the second total time taken for transferring the analog signal AO (e.g., when the duty ratio of the switch signal is required to be set to 80%) (S72: No), as exemplified in FIGS. 8A and 8B, the time period when the switch signal is output (i.e., the switch signal takes the H level) is set not to conflict with a time period around the sampling point for the analog signal AO (S74).

After S73 or S74, the CPU 471 goes to S77, where the CPU 471 stores onto the NVRAM 477 the timing to output the switch signal (i.e., the time period when the switch signal takes the predetermined H level) set in S73 or S74 together with the above sampling point for the analog signal AO (S77). Thereafter, the CPU 471 terminates the timing setting process.

Referring back to FIG. 6, since the NVRAM 477 stores the timing to output the switch signal and the sampling point for the analog signal AO as described above, the CPU 471 reads out the timing to output the switch signal and the sampling point for the analog signal AO in S7. Subsequently, the CPU 471 performs a double-side reading process (see FIG. 9) with the first reading device 210 and the second reading device 230 in S8, and thereafter terminates the reading process.

As illustrated in FIG. 9, in the double-side reading process, the CPU 471 initially starts document feeding with the feeding unit 100 to transmit a driving signal to a feeding motor (not shown) from the ASIC 460 (S81). Subsequently, the CPU 471 determines whether there is (a first side of) a document sheet that faces the first reading device 210, based on the signal from the RB sensor 320 (S82). When there is not (a first side of) a document sheet that faces the first reading device 210 (S82: No), the CPU 471 goes to S83, where the CPU 471 determines whether there is (a second side of) a document sheet that faces the second reading device 230, based on the signal from the R sensor 330 (S83). When there is not (a second side of) a document sheet that faces the second reading device 230 (S83: No), the CPU 471 goes back to S82.

Thus, when a document sheet is conveyed to a position to face the first reading device 210 (S82: Yes) while the steps S82 and S83 are repeatedly being executed, the CPU 471 goes to S85 to determine whether there is (a second side of) a document sheet that faces the second reading device 230 at that time (S85). Immediately after a first document sheet is fed, there is (a first side of) a document sheet that faces the first reading device 210 (S82: Yes), but there is not (a second side of) a document sheet that faces the second reading device 230 (S85: No). Thus, the CPU 471 goes to S86, where the CPU 471 issues the start signal SP from the timing generation circuit 465, and controls the first reading device 210 to read a line of image on the first side of the document sheet (S86). Subsequently, the analog signal AO transferred from the first reading device 210 is processed in the aforementioned manner via the sample/hold circuit 461 and the A/D conversion circuit 463 (S87). Thereafter, the CPU 471 determines whether all data have completely been transferred to the ASIC 460 (S89).

It is noted that more specifically, in S89, the CPU 471 determines whether the analog signals AO and the digital signals DO, corresponding to reading operations for all lines of document sheets placed on the fed tray 110, have completely been transferred. At this time, when data transfer for all the document sheets has not been completed (S89: No), the CPU 471 goes back to S82.

When the first document sheet is further conveyed, the first document sheet comes to face the second reading device 230, and thus the CPU 471 determines that there is (a second side of) a document sheet that faces the second reading device 230 (S85: Yes). Then, the CPU 471 goes to S91, where the CPU 471 controls the first reading device 210 to read a line of image on the first side of the document sheet in the same manner as S86 (S91). the CPU 471 controls the second reading device 230 to read a line of image on the second side in response to the start signal SP issued in S91 (S92). Here, the image data read by the second reading device 230 is once held in the buffer 237 as the aforementioned digital value, and then transferred to the ASIC 460 as the digital signal DO in the subsequent step S93 in accordance with a digital transfer process as shown in FIG. 10.

It is noted that as described above, at the time to start the digital transfer process shown in FIG. 10, the digital value is held in the buffer 237 of the second reading device 230. In the digital transfer process, the CPU 471 initially determines whether the timing generation circuit 465 issues an H-level signal as the switch signal (S933). Specifically, when the timing data is read out in the aforementioned step S7, the timing generation circuit 465 issues the switch signal in synchronization with the clock signal CLK1 at the timing as exemplified in FIGS. 5A and 5B or FIGS. 8A and 8B. Thus, in S933, the CPU 471 determines whether the issued switch signal is in the H level.

When the switch signal is in the L level (S933: No), the CPU 471 goes to S934, where the CPU 471 determines whether it is currently the sampling point (S934). When it is not currently the sampling point (S934: No), the CPU 471 goes to 935, where the CPU 471 determines whether a reading operation has completely been performed for each pixel of one line in the main scanning direction (S935). When a reading operation has not completely been performed for each pixel of one line in the main scanning direction (S935: No), the CPU 471 goes back to S933.

When the switch signal turns to the H level (S933: Yes) while the steps S933 to S935 are repeatedly being executed, the CPU 471 goes to S937, where the CPU 471 receives the digital signal DO that is transferred from the second reading device 230 in response to the switch signal turning to the H level (S937). Thereafter, the CPU 471 goes to S935. When the digital signal DO is received via the LVDS interface 467 in S935, image processing for the digital signal DO is implemented by the image processor 479.

When it becomes currently the sampling point while the steps S933 to S935 are repeatedly being executed, the sample/hold signal SH1 is issued to the sample/hold circuit 461, and a digital signal corresponding to the analog signal AO from the first reading device 210 is output from the A/D conversion circuit 463. Then, image processing is implemented by the image processor 479 for the digital signal output from the A/D conversion circuit 463. Thus, when the reading operation for each pixel of one line is completed after the repeated execution of S933 to S939 (S935: Yes), the CPU 471 goes to the aforementioned step S89 (see FIG. 9).

Referring back to FIG. 9, when a trailing end of a final document sheet passes through the position to face the first reading device 210 after repeated execution of S82 to S93, it comes to a state where there is no document sheet facing the first reading device 210 (S82: No) and there is a document sheet facing the second reading device 210 (S83: Yes). In this state, the CPU 471 goes to 97, where the CPU 471 controls the second reading device 230 to read a line of image on the second side of the final document sheet in response to the start signal SP from the ASIC 460 (S97). Subsequently, the CPU 471 controls the timing generation circuit 465 to hold the switch signal in the H level, such that the digital signal DO corresponding to each pixel of the one line is sequentially transferred to the ASIC 460 (S99). Thus, when all data corresponding to images on the first and second sides of all document sheets up to the final document sheet have completely been transferred to the ASIC 460 after repeated execution of S82 to S99 (S89: Yes), the CPU 471 terminates the reading process (see FIG. 6).

[Effects of the Embodiment]

As described above, in the embodiment, the signal transferred through the first harness 410 is the analog signal AO, and the signal transferred through the second harness 430 is the digital signal DO transferred with a low voltage and a low noise based on the differential transmission method. Therefore, in the embodiment, interference is less likely to be caused between the signal transferred through the first harness 410 and the signal transferred through the second harness 430, and thus it is possible to reduce the level of crosstalk between the signals. Accordingly, it is possible to perform accurate processing for the images read out of both the first and second sides of each document sheet.

Further, in the embodiment, the digital signal DO is transferred via the second harness 430 at timing (in a time period) that does not conflict with the sampling point when the analog signal AO transferred through the first harness 410 is converted into the digital signal. Therefore, it is possible to prevent, in a more preferable manner, the digital signal DO from affecting the waveform of the analog signal AO that is to be converted into the digital signal via the sample/hold circuit 461 and the A/D conversion circuit 463. Thus, in the embodiment, it is possible to perform highly accurate processing for the images read out of the first and second sides of each document sheet. Further, the digital signal DO is transferred in response to the switch signal being issued by the timing generation circuit 465 which switch signal takes the H level during a time period that does not conflict with a time period around the sampling point. Therefore, the second reading device 230 is merely required to transfer the digital signal DO when the switch signal takes the H level. Thereby, it is possible to further simplify the processing to be performed by the second reading device 230 and to further downsize and lighten the second reading device 230.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

When the first total time taken for transferring the digital signal DO is equal to or shorter than half the second total time taken for transferring the analog signal AO (S72: Yes), the switch signal has the same waveform as that of the clock signal CLK1 as shown in FIGS. 5A and 5B. When the condition is satisfied in most cases of the second reading device 230, the clock signal CLK1 output from the timing generation circuit 465 may be applied as the switch signal for the second reading device 230 as illustrated in FIG. 11. In this case, it is possible to reduce the number of the kinds of the signals used in the control system, and to further simplify the configuration and the control technique applied to the control system of the MFP 1. Furthermore, since the clock signal CLK1 is divided outside the ASIC 460 in the example shown in FIG. 11, it is possible to reduce the number of terminals of the ASIC 460.

Additionally, such a configuration may be applied in the case where the first total time taken for transferring the digital signal DO is longer than half the second total time taken for transferring the analog signal AO. In this case, a pixel of data may be transferred from the second reading device 230 separately during periods in each of which the clock signal CLK1 takes the H level. Nonetheless, when the first total time taken for transferring the digital signal DO is equal to or shorter than half the second total time taken for transferring the analog signal AO as described above, a pixel of data does not have to be separately transferred, and thus it leads to simplified data processing. Moreover, in the case where the duty ratio of the switch signal is set to 50% in the aforementioned manner, when the switch signal is output to take a predetermined H level during a time period outside the last half in each period of the analog signal AO, it is possible to prevent the timing to output the switch signal (i.e., the time period when the switch signal takes the H level) from conflicting with the sampling point when the analog signal AO is converted into the digital signal. Thus, it leads to further simplified data processing.

In the MFP 1 according to aspects of the present invention, for instance, double-side copy control may be implemented to read images on the both sides of a document sheet and form the same images as the read images on the both sides of a sheet with the image forming unit 800. In this case, to form the images on the both sides of the sheet takes a time period twice as long as a time period required for single-side image forming. Therefore, even though a time period taken for reading the both sides of the document sheet is twice as long as a time period taken for reading a single side of the document sheet, it does not have any significant influence on efficiency in the double-side copy control.

Further, the CPU 471 may be configured to implement facsimile transmission control to transmit a read image via a modem (not shown) and scanning control to store data of the read image onto one or more of various kinds of storage media, as well as the aforementioned double-side copy control. In other words, the image reader 10 according to aspects of the present invention may not necessarily be incorporated in a device having an image forming unit.

Further, the LVDS interface 467 according to aspects of the present invention may not necessarily be configured as exemplified in the aforementioned embodiment. For instance, the LVDS interface 467 may be configured to transfer the digital value held (stored) in the buffer 237 as is to the control board 450 without converting the digital value into the digital signal DO to be transmitted in the differential transmission method. This is because a time period to output the digital value held in the buffer 237 does not conflict with the sampling point for the analog signal AO, and thus it is possible to reduce a level of crosstalk between the analog signal AO and the digital signal output from the buffer 237 without having to convert the digital value into the digital signal DO to be transmitted in the differential transmission method.

Further, the control board 450 may be configured to merely perform a simple process (such as attaching a time stamp) for the analog signal AO output from the first image reading device 210 or the digital signal output from the second reading unit 230. Moreover, the second reading device 230 may not necessarily transfer the digital signal DO in the differential transmission method. Furthermore, the switch signal output from the timing generation circuit 465 may not necessarily be a rectangular pulse that alternately takes the H level and the L level. For instance, the switch signal may be data that indicates the time of the sampling point.

What is claimed is:

1. An image reader comprising:
   a first image reading unit comprising:
      a first sensor configured to read an image on a first side of a document sheet being conveyed on a feeding path,
      wherein the first image reading unit is configured to start sending a first analog signal corresponding to the image read by the first sensor when the first image reading unit receives a first start signal;
   a second image reading unit comprising:
      a second sensor configured to read an image on a second side opposite to the first side of the document sheet being conveyed on the feeding path; and
      a second converter configured to convert a second analog signal corresponding to the image read by the second sensor into a second digital signal,
      wherein the second image reading unit is configured to start sending the second digital signal when the second image reading unit receives a timing signal after the second image reading unit receives a second start signal; and
   a processor configured to:
      send the first start signal to the first image reading unit;
      send the second start signal to the second image reading unit;
      continuously receive a first analog signal from the first image reading unit;
      convert the first analog signal into a first digital signal at predetermined time intervals;
      send the timing signal to the second image reading unit while the processor is not converting the first analog signal into the first digital signal; and
      receive the second digital signal from the second image reading unit while the processor is not converting the first analog signal into the first digital signal.

2. The image reader according to claim 1,
   wherein the processor is further configured to send:
      a first clock signal that is periodically issued with a first period and input into the first image reading unit to control timing of image reading by the first sensor; and
      a second clock signal that is periodically issued with a second period half as long as the first period and input into the second image reading unit to control timing of image reading by the second sensor,
   wherein the first clock signal sent from the processor is input into the second image reading unit as the timing signal.

3. The image reader according to claim 1,
   wherein the first image reading unit is configured to start sending the first analog signal at intervals of a predetermined period,
   wherein the second image reading unit is configured to start sending the second digital signal at intervals of the predetermined period, and
   wherein the processor is configured to periodically output the timing signal at a duty ratio of 50% when a second time period taken for the second image reading unit to send the second digital signal in the predetermined period is equal to or shorter than half a first time period taken for the first image reading unit to send the first analog signal in the predetermined period.

4. The image reader according to claim 1,
wherein the processor comprises an image processor configured to:
  perform image processing for the second digital signal sent from the second image reading unit, in a time period during which the timing signal is sent to the second image reading unit while the processor is not converting the first analog signal into the first digital signal; and
  perform image processing for the first digital signal converted from the first analog signal, in a time period outside the time period during which the timing signal is sent to the second image reading unit while the processor is not converting the first analog signal into the first digital signal.

* * * * *